United States Patent Office 2,897,088
Patented July 28, 1959

2,897,088
PROCESS FOR CANNING FRESH PRUNES

Eugene A. Bozzo, Gilroy, Calif.

No Drawing. Application December 20, 1956
Serial No. 629,449

6 Claims. (Cl. 99—186)

This invention relates to a process for preserving prunes and more particularly to a novel and new process for canning fresh prunes.

As is well known, prunes are usually dehydrated and stored in dry form for a considerable time before packaging and/or processing for canning. With the present invention the steps of processing fresh prunes may be accomplished immediately from their ripe stage to the cans. It is one of the purposes of this invention to minimize the number of steps in the processing of prunes. In this connection it is an object to attain that process with only a partial dehydration whereby the amount of moisture allowed to remain in the fruit will be useful in obtaining a pack in which the fruit has a better fresh-like color and a softer but firmer body than possible with the former method of canning. This step has also overcome the graying or lightening of the skin color of the prunes as caused by blanching during the steaming stage in previously known processing practices. Moreover this partial dehydration has proven to improve the flavor of the prunes and to preserve them in a more natural state.

It is a further object to subject the prunes to a cold bath containing an alkaline reagent in solution both before and immediately following the partial dehydration.

The alkaline reagent bath as contemplated by this invention is for the purpose of removing the bloom, that powdery coating usually found on the natural fruit. This removal of bloom which is greatest in the first stage and before dehydration tends to leave the naturally darkened skin color on the fruit. The subsequent partial dehydration has been found to bring out or emphasize any remaining bloom on the fruit consequently requiring further bathing of the prunes in a milder solution of the reagent to remove the remaining bloom from the fruit. It is believed that by so attaining the natural color on the fruit less actual cooking or steaming is required and the natural, fresh, uncooked flavor and texture of the prunes is thereby preserved.

It is another object of this invention to provide a process by which a relatively dry, i.e., unsyrupy but moist pack can be obtained. In this connection the present process contemplates packing the prunes in glass jars from which the fruit is ready to serve direct from the jars. Moreover, by packing the prunes prepared in accordance with the instant process in glass the color of the fruit is visible to the consumer, and the natural color attracts consumers. In addition to preserving the fruit in its natural color as aforesaid, the flavor is also maintained by avoiding additional heat from steaming both before and after the partial dehydration.

These and other objects and advantages of the present process will become apparent in the following procedure and claims.

The prunes are taken direct from the orchard in their fresh and ripened condition. These fresh prunes are first cleaned by submersing them in a hot bath of mild alkaline solution. For best results the ripe green prunes are dipped into a solution containing from 4% to 5% caustic soda, Sal Soda or the like at a water temperature of from 185° to 195° F. for from 2 to 3 minutes. This is followed by a subjecting the prunes to a spray of cold water immediately after they are removed from the alkaline bath. In this manner the major portion of the bloom is removed without cooking the meat within the fruit. The prunes thus cleaned are examined while being graded for quality. Those prunes with broken skin, blemishes or deformities are culled out while the remaining prunes are separated and selected for size and quality.

The selected prunes go direct from the grader into the dehydrator operating at a temperature range from 175° F. to 185° F. When the natural moisture content of the prunes drops below 55% they are about ready for removal. The prunes are removed before the moisture content drops below 45%. For purposes of this process best results have been obtained by stopping dehydration when the moisture content of the prunes is between 45% and 55%. Thus the fruit is still relatively moist and smooth of skin as compared with wrinkled skinned texture produced by the usual or extreme dehydration process.

Immediately following the foregoing partial dehydration of the prunes to a 45% to a 55% moisture content the prunes may be cooled and stored in a place for cold storage above 32° to prevent mold formation. This step is merely a matter of convenience and may be eliminated by continuing the process as follows:

Either upon removal of the prunes from cold storage or after cooling thereof following partial dehydration, the prunes are again dipped into a solution containing a reagent as before but of a milder proportion. This second dip is into a solution containing from 1% to 2% caustic soda or the like at a water temperature of about 185° F. for 2 minutes. This step followed immediately by a cold water wash, rinse or spray removes the remaining bloom from the prunes.

The next step entails packing the cooled, partially dehydrated prunes in containers such as cans or glass jars, the latter being preferred because of the fresh-like appearance of the fruit. Moreover, the glass jars assure against swelling and eliminate the necessity of special treatment such as is required of the walls of tin cans to prevent swelling of the fruit.

The prunes are put into sterilized jars in proper quantity without compressing or packing the prunes too tightly. The jars with prunes therein are then placed in an exhaust box or the like where they are preheated. This preheating consists of subjecting both prune and jar to a 190° F. heat for a period of about 25 minutes. The jars with prunes therein are next inverted to remove water from the jars as well as the fruit. During inversion of the filled jars a screen or strainer may be placed over the mouth of each jar so that water can drain from the jars without spilling of the prunes therefrom. By removing the water from the jars cooking and/or boiling of the prunes under the high temperatures of the following step is minimized and/or avoided.

The preheated prunes are now enclosed in the jars by placing lids on the jars. In commercial packing the conventional crimped lids are used with jars having a retaining bead on the neck end thereof. However, screw type lids and jars may be used if desired.

The lidded jars with prunes therein are next placed and sealed in an autoclave subjected to a temperature of from 214° F. to 230° F. for a period of from 45 to 90 minutes. The range of temperature at this stage is conversely coordinated with the time of exposure dependent upon the size of fruit and the quantity of fruit in each jar or receptacle. In other words, at the lower temperature (214° F.) of the range specified the time of exposure should be the maximum lapse or 90 minutes, whereas at the higher temperature (230° F.) of such range thereof the period of exposure thereto is cut down to about 45 minutes.

Immediately following the pressure cooking in the autoclave as aforesaid, the lidded jars with fruit therein are cooled to thus induce vacuumization within the jars. This cooling must be gradual under the circumstances and under commercial practices is usually accomplished in less time by the use of water at graduated stages of temperature drop to assure against breakage of the glass jars and to accelerate the gradual cooling step.

Tests have shown that the interior of the jars attain a vacuum of about 15 to 20 inches of mercury after cooling.

The resulting product of the foregoing steps is a relatively full bodied soft fruit which may be served direct from the container after opening thereof. The prunes thus processed may be used in the baking of cakes, cookies or desserts. If desired the prunes thus processed may be stewed for approximately five or ten minutes and served as stewed prunes.

Having thus described the steps constituting the process of the present invention, what I claim and desire to protect by Letters Patent is:

1. The process of preparing prunes for eating consisting of the steps of dipping freshly picked prunes in a mild, hot solution of from 4% to 5% caustic soda for a period of 2 to 3 minutes and immediately washing the prunes in cold water to remove the powdery bloom from the fruit, then partially dehydrating the prunes until their moisture content is reduced to from 45% to 55% of their original moisture content, again dipping the prunes in a milder, hot solution of from 1% to 2% caustic soda for a period of 2 minutes to remove the remaining bloom therefrom, preheating the prunes for a period of about 25 minutes at 190° F., and cooking the prunes in an autoclave at from 214° F. to 230° F. for a period of from 45 to 90 minutes, and then gradually cooling the prunes.

2. The process of preserving fresh prunes consisting of the steps of dipping freshly picked prunes for 2 to 3 minutes in a mild solution of from 4 to 5 percent caustic soda at a water temperature of 185° F. to 195° F. and immediately washing the prunes thus treated in cold water to remove the powdery bloom from the skin of the prunes, then partially dehydrating the prunes until their moisture content is reduced to a point within a range of from 45% to 55% of their original moisture content, again dipping such prunes in a similar but milder solution of approximately 1% to 2% caustic soda at a water temperature of 185° F. to 195° F. for a period of 2 minutes, placing such prunes in jars, subjecting the jars and prunes therein to a preheat of 190° F. for substantially 25 minutes, removing excess water from the jars and prunes therein, lidding the jars to seal the prunes therein, placing the sealed jars with prunes therein in a retort held at from 214° F. to 230° F. temperature for 45 to 90 minutes and then gradually cooling the jars and fruit therein.

3. The process of preserving fresh prunes consisting of the steps of dipping freshly picked prunes in a solution at water temperature of from 185° F. to 195° F. containing a 4 to 5 percent proportion of an alkaline reagent for a period of from 2 to 3 minutes, and immediately rinsing the prunes with cold water after removal of the prunes, from such solution to remove powdery bloom from the prunes, then dehydrating the prunes at a temperature ranging from 175° F. to 185° F. until the moisture content of the prunes is reduced to a point within the range of from 45% to 55% of the original moisture content thereof, then again dipping the prunes in a solution at 185° F. to 195° F. temperature containing an alkaline reagent of from 1 to 2 percent in solution for a period of 2 minutes followed by a cold water wash to remove the remaining bloom from the prunes, then placing the prunes in jars and preheating the jars and prunes therein by subjecting them to a 190° F. heat for approximately 25 minutes, removing water from the jars and prunes, lidding the jars and placing the lidded jars with fruit therein in an autoclave, subjecting the lidded jars to a heat of 214° F. to 230° F. within the autoclave for a period of from 45 minutes to 90 minutes and then gradually cooling the jars and prunes therein.

4. The process of preparing prunes for eating consisting of the steps of dipping freshly picked prunes in a solution of 4% to 5% caustic soda at a water temperature of 185° F. to 195° F. for a period of 2 to 3 minutes and immediately washing the prunes in cold water to remove the powdery bloom from the fruit, then partially dehydrating the prunes until their moisture content is reduced to from 45% to 55% of their original moisture content, then dipping the prunes in a solution of 2% caustic soda at a water temperature of 185° F. for a period of 2 minutes followed by a cold water rinse to remove the remaining bloom from the fruit, preheating the prunes for a period of 25 minutes at 190° F., and cooking the prunes in an autoclave at from 214° F. to 230° F. for a period of from 45 to 90 minutes, and then gradually cooling the prunes.

5. The process of preserving fresh prunes consisting of the steps of dipping freshly picked prunes for 2 to 3 minutes in a solution of 4% to 5% caustic soda in water at a temperature of from 185° F. to 195° F. and immediately washing the prunes thus treated in cold water to remove the powdery bloom from the skin of the prunes, then partially dehydrating the prunes until their moisture content is reduced to a point within a range of from 45% to 55% of their original moisture content, again dipping such prunes in a milder solution of water at a temperature of 185° F. to 195° F. with not more than 2% caustic soda for a period of 2 minutes followed by a cold water rinse to remove the remaining bloom from the prunes, placing such prunes in jars, subjecting the jars and prunes therein to a preheat of 190° F. for substantially 25 minutes, removing excess water from the jars and prunes therein, lidding the jars and sealing the prunes therein, placing the sealed jars with prunes therein in an autoclave and subjecing them to a heat of from 214° F. to 230° F. temperature for 45 to 90 minutes and then gradually cooling the jars and fruit therein.

6. The process of preserving fresh prunes consisting of the steps of dipping freshly picked prunes in a solution at water temperature of from 185° F. to 195° F. containing a 4% to 5% alkaline reagent for a period of from 2 to 3 minutes, then immediately rinsing the prunes with cold water after removal of the prunes from such solution to remove powdery bloom from the prunes, then dehydrating the prunes at a temperature ranging from 175° F. to 185° F. until the moisture content of the prunes is reduced to a point within the range of from 45% to 55% of the original moisture content thereof, then again dipping the prunes for a period of 2 minutes in a solution at 185° F. to 195° F. temperature containing at least a 1% and not more than a 2% alkaline reagent followed by a cold water wash to remove the remaining bloom from the prunes, then placing the prunes in jars and preheating the jars and prunes therein by subjecting them to a 190° F. heat for approximately 25 minutes, inverting the jars and prunes for removing water from the jars and prunes, lidding the jars and placing the lidded jars with fruit therein in an autoclave, subjecting the lidded jars to a heat of 214° F. to 230° F. within the autoclave for a period of from 45 minutes to 90 minutes and then gradually cooling the jars and prunes therein.

References Cited in the file of this patent

UNITED STATES PATENTS

| | | |
|---|---|---|
| 539,258 | Gibson | May 14, 1895 |
| 1,721,929 | Steinwand | July 23, 1929 |
| 1,976,961 | Pape | Oct. 16, 1934 |
| 2,548,284 | Battaglia | Apr. 10, 1951 |

OTHER REFERENCES

"Encyclopedia of Food," by Ward, 1923, pp. 418–419.